(12) United States Patent
Yu et al.

(10) Patent No.: US 8,347,620 B2
(45) Date of Patent: Jan. 8, 2013

(54) BYPASS/FLUSHING VALVE FOR CLOSED HYDRAULIC CIRCUIT

(75) Inventors: Gang Yu, Jiangsu (CN); Zhongming Ye, Jiangsu (CN); Fugang Li, Jiangsu (CN)

(73) Assignee: White (China) Drive Products Co., Ltd., Zhenjiang, Jiangsu (CN)

( * ) Notice: Subject to any disclaimer, the term of this patent is extended or adjusted under 35 U.S.C. 154(b) by 684 days.

(21) Appl. No.: 12/636,351

(22) Filed: Dec. 11, 2009

(65) Prior Publication Data
US 2011/0094601 A1    Apr. 28, 2011

(30) Foreign Application Priority Data
Oct. 26, 2009  (CN) .......................... 2009 1 0180609

(51) Int. Cl.
F16D 31/02    (2006.01)
(52) U.S. Cl. .............................. 60/464; 60/468; 137/240
(58) Field of Classification Search .................... 60/464, 60/468; 137/240
See application file for complete search history.

(56) References Cited

U.S. PATENT DOCUMENTS

| | | | |
|---|---|---|---|
| 4,628,690 A | 12/1986 | Arai et al. | |
| 5,546,752 A | 8/1996 | Horton et al. | |
| 6,802,182 B2 | 10/2004 | Bigo et al. | |
| 6,837,047 B2 | 1/2005 | Dong et al. | |
| 6,993,904 B2 * | 2/2006 | Hazzard et al. | 60/452 |
| 7,000,387 B2 | 2/2006 | Widemann | |
| 7,430,860 B2 | 10/2008 | Whitaker et al. | |
| 2004/0006981 A1 * | 1/2004 | Dong et al. | 60/464 |
| 2005/0005600 A1 * | 1/2005 | Gandrud | 60/464 |

* cited by examiner

*Primary Examiner* — Edward Look
*Assistant Examiner* — Logan Kraft
(74) *Attorney, Agent, or Firm* — Rankin, Hill & Clark LLP

(57) ABSTRACT

A bypass/flushing valve for a hydrostatic system includes a valve body including a central bore, a shuttle valve located in the central bore, and a valve spindle disposed within the central bore. The valve body includes four ports each in communication with the central bore. The shuttle valve blocks flow through the central bore between a first port and a second port. When pressure at the second port is higher than at the first port, the shuttle valve moves to allow flow passage between the first port and the third port. When pressure at the first port is higher than at the second port, the shuttle valve moves to allow flow passages between the second port and a third port. The spindle is movable between a first position to block communication between the second port and the fourth port and a second position to allow for communication between the second port and the fourth port.

19 Claims, 3 Drawing Sheets

BYPASS/FLUSHING VALVE FOR CLOSED HYDRAULIC CIRCUIT

BACKGROUND

Hydrostatic transmissions have been used to propel vehicles, such as zero-turn mowers. Hydrostatic transmissions typically include a variable displacement main pump connected with a hydraulic motor in a closed hydraulic circuit via a high pressure supply line and a low pressure return line. The main pump is typically driven by a prime mover, e.g. an internal combustion engine of the vehicle. Changing the displacement of the main pump changes the output flow rate, which controls the speed of the motor connected with the main pump. Main pump outflow can also be reversed, thus reversing the directional rotation of the hydraulic motor attached to the main pump. Both acceleration and deceleration of the transmission are controlled by varying the displacement of the main pump from its neutral position. A charge pump is typically added to the hydraulic circuit to introduce fluid into the circuit to make up for lost fluid due to internal leakage.

Closed hydraulic circuits are known to include shuttle valves in the low pressure line that allow a small portion of working fluid to drain from the low pressure side of the circuit to carry out some of the contaminants and heat. This drained fluid is cooled and cleaned through hydraulic filters and reservoir (cooler) and reintroduced into the circuit by the charge pump.

Bypass valves, which are positioned between a high pressure supply line and a low pressure return line that connect the main pump to the motor, allow the transfer of fluid from one line to the other. The bypass valve can enable the motor to rotate with little resistance, which allows the vehicle to be easily towed.

Known hydraulic systems separate the bypass valve and the flushing valve into separate valve assemblies. In known systems, these two valve assemblies are located in two separate locations within the circuit. This requires the manufacture of two separate components and two separate connection locations within the hydraulic circuit. Where the bypass valve and the separate flushing valve are both found in a pump housing, the two separate valves take up a lot of space and require more material to provide for connection between the valves and the working components of the pump.

SUMMARY

An example of a bypass/flushing valve for a hydrostatic system that can overcome the aforementioned shortcomings includes a valve body including a central bore, a shuttle valve located in the central bore, and a valve spindle disposed within the central bore. The valve body includes four ports each in communication with the central bore. The shuttle valve blocks flow through the central bore between a first port and a second port of the four ports. When pressure at the second port is higher than at the first port, the shuttle valve moves to allow flow passage between the first port and a third port of the four ports. When pressure at the first port is higher than at the second port, the shuttle valve moves to allow flow passages between the second port and the third port. The spindle is movable between a first position, which blocks flow between the second port and a fourth port of the four ports, and a second position, which allows flow between the second port and the fourth port.

An example of a hydraulic assembly that can overcome the aforementioned shortcomings includes a pump housing, a first passage in the pump housing operable as a high pressure supply line or a low pressure return line, a second passage in the pump housing operable as a high pressure supply line or a low pressure return line, a tank line passage in the pump housing, a bypass/flushing valve passage in the pump housing, and a system relief path in the pump housing. The tank line passage is configured to connect with an associated reservoir. The bypass/flushing valve passage intersects with the first passage and the second passage. The bypass/flushing valve passage is formed having a linear central axis. The system relief path is in communication with the first passage, the second passage and the bypass/flushing valve passage. The assembly further includes a flushing valve in the bypass/flushing valve passage and a bypass valve in the bypass/flushing valve passage. The flushing valve blocks flow between the first passage and the second passage through the bypass/flushing valve passage. When pressure in the second passage is higher than in the first passage, the flushing valve allows flow passage between the first passage and the tank line passage. When pressure in the first passage is higher than in the second passage, the flushing valve allows flow passage between the second passage and the tank line passage. The bypass valve operates in a first position, which blocks fluid flow between the first passage and the second passage through the system relief path. The bypass valve also operates in a second position, which allows fluid flow between the first passage and the second passage through the system relief path.

Another example of a hydraulic assembly that can overcome the aforementioned shortcomings includes a hydraulic pump housing, a valve body, a shuttle valve, and a bypass valve spindle. The hydraulic pump housing includes a first inlet/outlet passage, a second inlet/outlet passage, a tank line passage, a bypass/flushing valve passage connected with the first inlet/outlet passage, the second inlet/outlet passage and the tank line passage, and a system relief path connected to the bypass valve passage. The valve body is disposed in the bypass/flushing valve passage and includes a central bore. The valve body also includes a first port in communication with the central bore and the first inlet/outlet passage, a second port in communication with the central bore and the second inlet/outlet passage, a third port in communication with the central bore and the tank line passage and a fourth port in communication with the central bore and the system relief path. The shuttle valve is located in the central bore and blocks flow through the central bore between the first port and the second port. When pressure at the second port is higher than at the first port, the shuttle valve moves to allow flow passage between the first port and the third port. When pressure at the first port is higher than at the second port, the shuttle valve moves to allow flow passage between the second port and the third port. The bypass valve spindle is also disposed within the central bore. The spindle is movable between a first position to block communication between the second port and the fourth port and a second position to allow for communication between the second port and the fourth port.

DETAILED DESCRIPTION

Figure 1:
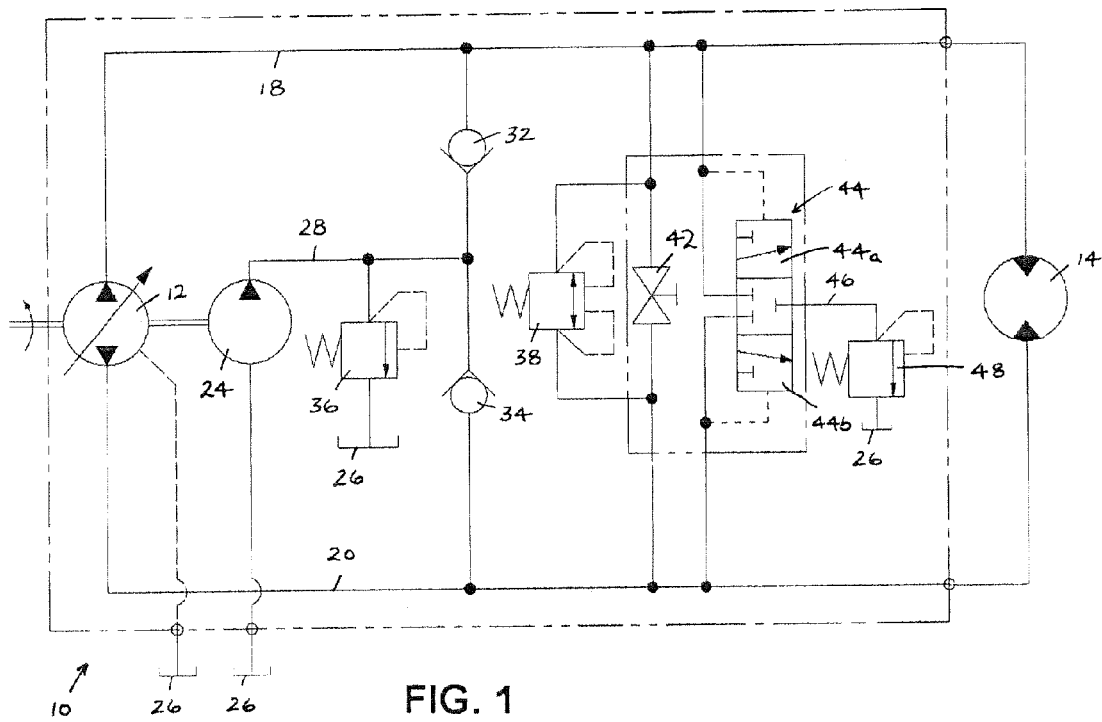
FIG. 1 is a schematic depiction of a hydraulic circuit including a bypass/flushing valve.

With reference to FIG. 1, a hydrostatic transmission closed-loop circuit 10 includes a variable displacement main pump 12 and a hydraulic motor 14 connected to each other by lines 18 and 20. The pump 12 includes a driven shaft 22 that is driven by a prime mover (not shown), such as an internal combustion engine, at a predetermined speed in predetermined direction. The motor 14 can connect to a wheel of a vehicle (not shown) to propel the vehicle.

The pump 12 that is depicted in FIG. 1 can be a variable displacement axial piston pump where the size and number of pistons are fixed. Changing the piston stroke length changes the displacement of the pump. The stroke length is determined by the angle of a swashplate (not shown), which can be tilted by a trunnion shaft (not shown). The trunnion shaft is connected to a control handle of a vehicle, e.g. a zero-turn mower, through a linkage installed in the vehicle. For example, when an operator pushes the control handle forward, the pump 12 delivers flow for a forward operation direction of the motor 14. Changing the displacement of the pump 12 changes the output flow rate, which controls the speed of motor 14. Moving the swashplate of the pump 12 overcenter reverses the flow out of pump 12, thus reversing the direction of motor 14. Depending upon the direction of the overcenter movement of swashplate, line 18 or line 20 of the circuit 10 can be a high pressure supply line or a low pressure return line.

The circuit 10 also includes charge pump 24, which can be also driven by the driven shaft 22. In the depicted circuit the charge pump 24 is a fixed displacement pump. The charge pump 24 supplies additional hydraulic fluid to the circuit 10 to compensate for fluid loss due to internal leakage. The charge pump 24 draws fluid from a reservoir, herein referred to as a tank 26, and supplies this additional fluid into the closed-loop circuit 10 through a conduit line 28 by way of one-way check valves 32 and 34. A charge pump relief valve 36 provides a relief path to the tank 26 when more than the required flow from the charge pump 24 cannot enter the circuit 10.

The hydraulic circuit 10 also includes a shock valve 38 positioned between lines 18 and 20 that protects each line from pressure overload during operation. The shock valve 38, which can operate as a bi-directional relief valve, employed in the depicted circuit 10 is more particularly described in U.S. Pat. No. 7,513,111, which is incorporated by reference herein.

The circuit 10 also includes a bypass valve 42 positioned between lines 18 and 20 to transfer fluid from one line to the other. Opening the bypass valve 42 short circuits the motor 14 with respect to the main pump 12 and allows the motor 14 to rotate with little resistance when it is desirable, for example, to move the vehicle without operating the transmission, e.g. when towing the vehicle that includes the circuit 10.

The hydraulic circuit 10 depicted in FIG. 1 also includes a flushing valve 44 that connects the low pressure side of the closed-loop circuit 10 to a tank line 46. The flushing valve 44 can allow hot oil discharged from the motor 14 to flow back to the tank 26 for cooling and filtering and replaced by cooled, filtered oil from the charge pump 24. The tank line 46 connects a relief valve 48 with the flushing valve 44 between the tank 26 and the flushing valve 44.

When the operator activates a stroke controlling device for the pump 12, e.g. the operator pushes or pulls the handle of the vehicle to initiate turning of the motor 14, the main pump 12 pumps fluid into the corresponding side of the circuit 10, either line 18 or 20. When the operator changes the direction of movement of the handle, the main pump 12 alters the direction of the fluid flow. When the pressure differential between lines 18 and 20 reaches a predetermined value, the flushing valve 44 moves to position 44a or position 44b. In position 44a, the fluid pressure in line 18 is greater than the fluid pressure in line 20. In position 44b, the fluid pressure in line 20 is greater than the fluid pressure in line 18. The flushing valve 44 senses which line 18 or 20 of the closed circuit 10 is at high pressure and can shift to expose the relief valve 48 to the low pressure side of the circuit 10. Hot, contaminated hydraulic working fluid can exit from the outlet of the hydraulic motor 14 via the flushing valve 44 and across the relief valve 48 where the hot, contaminated hydraulic fluid goes back to the tank 26 bypassing the hydraulic pump 12.

Figure 2:
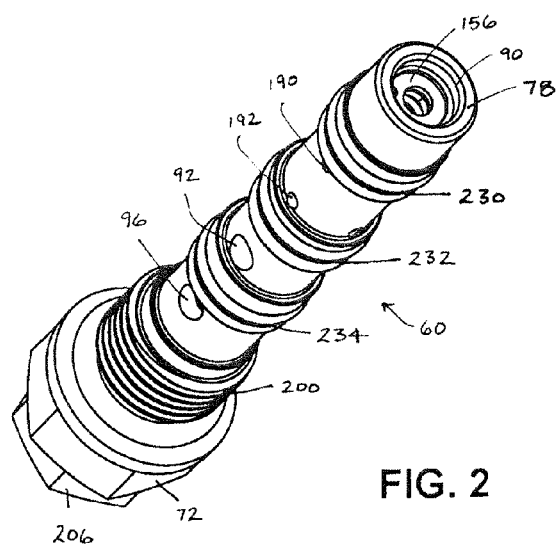
FIG. 2 is a perspective view of the bypass/flushing valve that was schematically depicted in FIG. 1.

In prior art systems, the bypass valve 42 and the flushing valve 44 are located in separate housings or casings found within the hydraulic circuit. FIG. 2 depicts a bypass/flushing valve 60 for a hydraulic system where the bypass valve, e.g. bypass valve 42 in FIG. 1, and the flushing valve, e.g. the flushing valve 44 in FIG. 1, are disposed within the same housing or casing. Such a configuration provides increased reliability and reduces the difficulty of maintaining quality consistency. The design also is easy to install and requires less space to assemble onto a pump housing.

Figure 3:
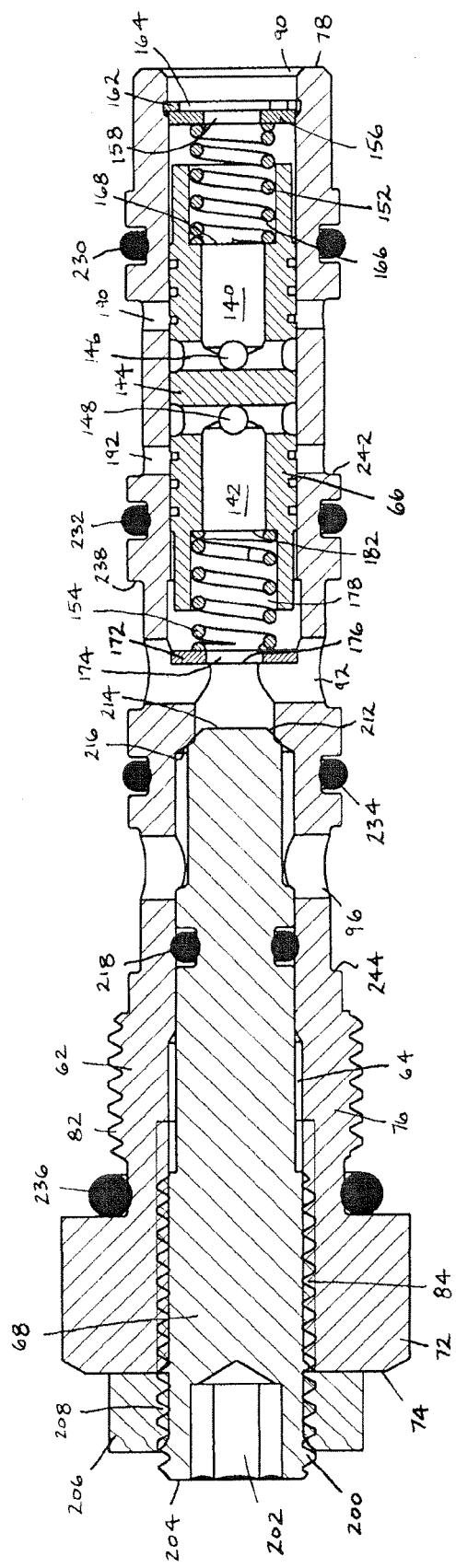
FIG. 3 is a cross-sectional view of the bypass/flushing valve shown in FIG. 2.

With reference to FIG. 3, the bypass flushing valve 60 includes a valve body 62 including a central bore 64, a shuttle valve 66 and a valve spindle 68 disposed within the central bore 64. With reference to FIGS. 2 and 3, the valve body 62 is generally an elongate cylindrical configuration including an enlarged head 72 at a proximal end 74 and a generally cylindrical shank 76 terminating at a distal end 78. The valve body 62 includes an externally threaded section 82 near the head 72. The central bore 64 extends axially through the valve body 62 from the proximal end 74 to the distal end 78. The valve body also includes an internally threaded section 84 located in the central bore 64 adjacent the proximal end 74. The valve body 62 also includes four ports that are each in communication with the central bore 64.

Figure 4:
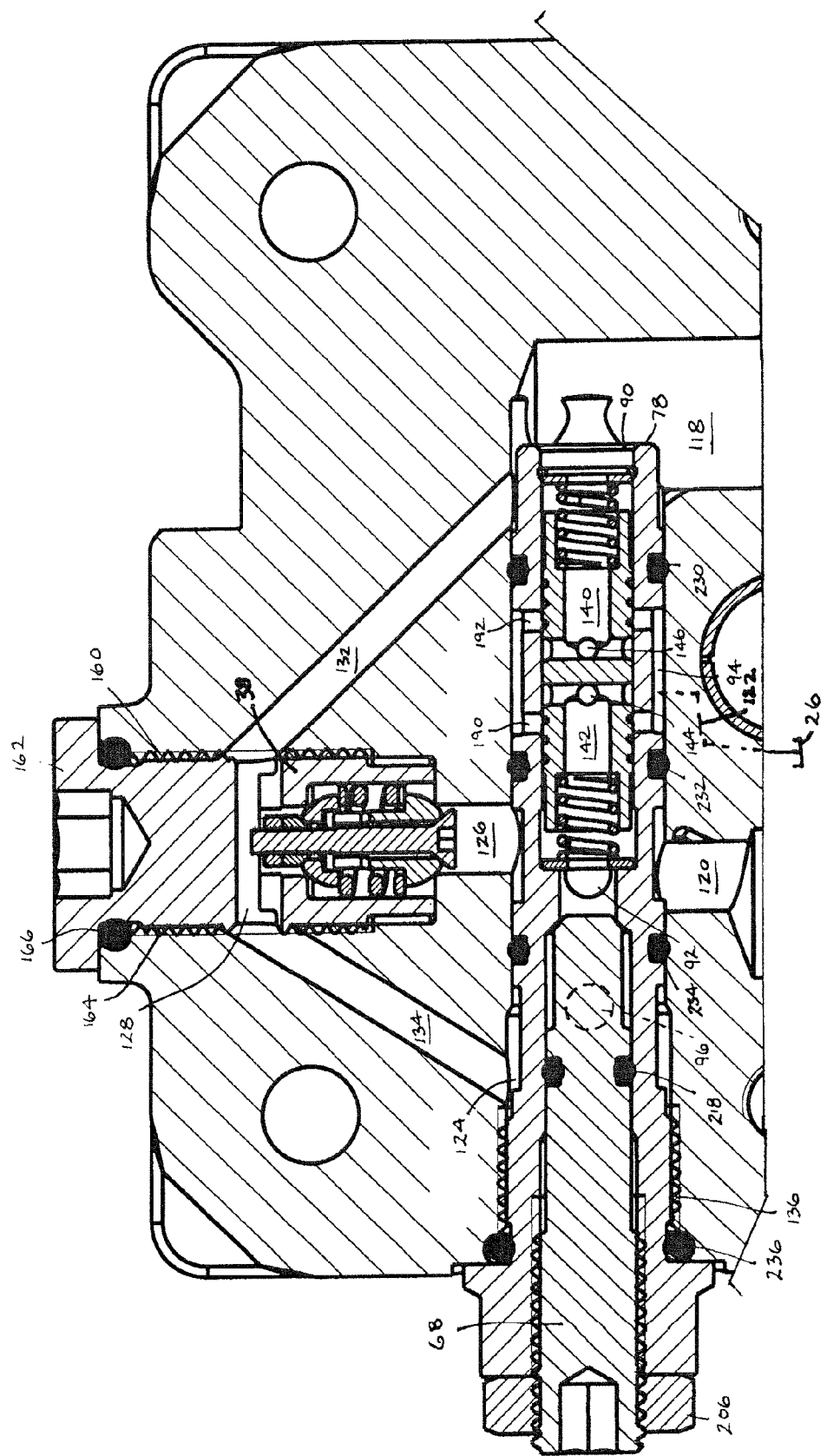
FIG. 4 is a cross-sectional view through a hydraulic pump housing showing the bypass/flushing valve disposed within the pump housing.

With additional reference to FIG. 4, the bypass/flushing valve 60 includes a first port 90, a second port 92, a third port 94, and a fourth port 96. FIG. 4 depicts the bypass/flushing valve disposed within a pump housing 100 and will be described with particular reference thereto. It should be understood, that the bypass/flushing valve could be located in another manifold housing within the closed loop circuit 10.

In the embodiment depicted in FIG. 4, the pump housing 100 includes passages 118 and 120 that connect, respectively, to lines 18 and 20 shown in FIG. 1. Accordingly, depending on the direction of the fluid flowing through the pump housing 100, either passage 118 or 120 can operate as a high pressure supply line or a low pressure return line. Accordingly, the passages 118 and 120 can also be referred to as inlet/outlet passages. In the embodiment depicted in FIG. 4, the passages 118 and 120 are a bored into the pump housing 100.

The pump housing 100 also includes a tank line passage 122 (depicted schematically in FIG. 4) that connects with the tank 26 (FIG. 1) via the tank line 46. The pump housing 100 also includes a bypass/flushing valve passage 124 and a system bypass/relief path, which in the depicted embodiment is made up of a first bore 126, a counterbore 128, a first angled bore 132, and a second angled bore 134. In the depicted embodiment, the bypass/flushing valve passage 124 extends from an external surface of the pump housing 100 and intersects the first passage 118, the second passage 120, the tank line passage 122, the first bore 126, the first angled bore 132 and the second angled bore 134. The bypass/flushing valve passage 124 is formed having a linear central axis. The pump housing 100 also includes an internally threaded section 136 in the bypass/flushing valve passage 124 that cooperates with the externally threaded section 82 on the valve body 62 to connect the bypass/flushing valve 60 with the pump housing 100.

With reference to FIG. 3, the shuttle valve 66 includes a first axial passage 140, a second axial passage 142, and a wall 144 separating the first axial passage from the second axial passage. The wall 144 prevents axial flow through the shuttle valve 66 from the first axial passage 140 to the second axial passage 142 and vice versa. The shuttle valve 66 also includes a first radial opening 146 (a set of first radial openings are shown) connected with the first axial passage 140 and a second radial opening 148 (a set of second radial openings are shown) connected with the second axial passage 142. The shuttle valve 66 depicted in FIGS. 3 and 4 is cylindrical in configuration and is coaxial with the central bore 64 of the valve body 62 and the bypass/flushing valve passage 124.

A first compression spring 152 in the central bore 64 biases the shuttle valve 66 towards the second port 92. The first spring 152 seats against an annular spring seat 156 including a central opening 158 that extends axially through the spring seat. The spring seat 158 is retained within the central opening 64 of the valve body 62 by a snap ring 162 that is also annular and includes a central opening 164 extending axially therethrough. The first spring 152 is also located within a first counterbore 166 formed in the shuttle valve 66 that is coaxial with and connected to the first axial passage 140. The first counterbore 166 defines a shoulder 168 in the shuttle valve 66 against which the first spring 152 acts.

A second compression spring 154 in the central bore 64 biases the shuttle valve towards the first port 90. The second spring 154 acts against an annular spring seat 172 having a central opening 174 extending axially therethrough. The spring seat 172 is seated against a shoulder 176 formed in the central bore 64 of the valve body 62. The second spring 154 is also located in a second counterbore 178 formed in the shuttle valve 66 that is coaxial with and connected to the second axial passage 142. The second counterbore 178 defines a shoulder 182 in the shuttle valve 66 against which the second spring 154 acts.

The shuttle valve 66 in the depicted embodiment can operate as a flushing valve. When pressure at the second port 92 is higher than at the first port 90, i.e. when pressure in the second line 20 is higher than at the first line 18, and this pressure differential is great enough to overcome the biasing force of the first spring, fluid at the low pressure side of the circuit, e.g. fluid entering from the port 90 is discharged into the tank 26 (FIG. 4) through the third port 94. More specific to the embodiment shown in FIGS. 2-4, the third port 94 includes a first radial aperture 190 (a set of radial apertures being shown) extending through the valve body 62 and a second radial aperture 192 (a set of radial apertures being shown) extending through the valve body 62. The first radial aperture(s) 190 is/are axially spaced from the second radial aperture(s) 192 along the valve body 62. Accordingly, when pressure at the second port 92 is higher than pressure at the first port so as to overcome the biasing force of the first spring 152, the shuttle valve 66 moves to the right (per the orientation shown in FIG. 3). Fluid entering into the central passage 64 of the valve body 62 at the first port 90 travels through the first axial passage 140 out the first radial opening 146 in the shuttle valve 66 and then out the first set of radial apertures 190 en route to the tank line 46 (FIG. 1).

When the pressure at the first port 90 is higher than the pressure at the second port 92, i.e. the pressure in the first line 18 is greater than the pressure in the second line 20, so as to overcome the biasing force of the second spring 154 the shuttle valve 66 can move to the left (per the orientation shown in FIG. 3). Fluid entering into the central bore 64 through the second port 92 travels through the second axial passage 142 and through the second radial opening 148 in the shuttle valve 66, then exits through the second set of radial apertures 192 en route to the tank line 46 (FIG. 1). Accordingly, when the pressure differential between the first line 18 and the second line 20 is great enough to overcome the respective biasing forces of the springs 152 and 154, fluid on the low pressure side of the circuit 10 passes through the central bore 64 en route to the tank 26 (FIG. 4).

As described above, the pump housing 100 also includes the system bypass path. With reference to FIG. 4, the counterbore 128 includes an internally threaded section 160 near an external surface of the pump housing 100. A bolt 162 including an externally threaded section 164 screws into the counterbore 128. A seal 166 surrounds the bolt 162 to seal the counterbore 128 from ambient. In the depicted embodiment where the bypass/flushing valve passage 124 connects with the first passage 118, the bypass/flushing valve passage 124 has a larger diameter than the external diameter of the distal end 78 of valve body 62. Accordingly, oil can flow between the first passage 118 and the first angled bore 132 around the distal end 78 of the valve body 62. For example, when the first passage 118 is operating as a high pressure supply line, fluid flows from the first passage 18 into the first angled passage 132 and through the counterbore 128. The fluid is blocked from exiting the pump housing 100 by the bolt 162 and the seal 166 and, therefore, flows into the second angled passage 134. Fluid continues to flow from the second angled passage 134 into the bypass/flushing valve passage 124 and then into the central bore 64 of the valve body 62 through the fourth port 96. With the valve spindle 68 fully threaded into the central opening 64, further flow is blocked in a manner that will be described in more detail below.

The valve spindle 68 operates as the bypass valve 42 for the closed loop hydraulic circuit 10 (FIG. 1). In the depicted embodiment, the valve spindle 68 includes external threads 200 that cooperate with the internal threads 84 formed in the central passage 64 of the valve body 62. The valve spindle 68 also includes a keyed recessed 202 that is configured to receive a tool, e.g. an Allen wrench, that allows the valve spindle to be threaded into and out of the central bore 64. The keyed recessed 202 is disposed in a proximal end 204 of the valve spindle 68. A tightening nut 206 having internal threads 208 threads onto the external threads 200 of the valve spindle to retain the valve spindle within the central bore 64. The spindle 68 includes a cylindrical configuration that is coaxial with the central bore 64 of the valve body 62 and the bypass/flushing valve passage 124.

The valve spindle 68 also includes a chamfered surface 212 at a distal end 214. The chamfered surface 212 cooperates with a valve seat 216 formed in the central bore 64 of the valve body 62. A seal 218 surrounds the valve spindle 64 at a location axial offset from the distal end 214 and the proximal end 204. The seal 218 blocks leftward flow (per the orientation shown in FIG. 3) of oil through the central bore 64 between the valve spindle 68 and the valve body 62.

With reference back to FIG. 4, with the chamfered end 212 of the valve spindle 68 seated against the valve seat 216, fluid entering into the fourth port 96 of the bypass/flushing valve 60 is blocked by the valve spindle 68 acting against the valve seat 216 and the seal 218. Where an operator unscrews the valve spindle 68 from the central bore 68 moving the chamfered end 212 away from the valve seat 216, fluid entering into the fourth port 96 can flow through the central opening 64 and exit the central bore 64 through the second port 92. Accordingly, a connection is now made between the first passage 118 and the second passage 120 so that oil from line 18 (FIG. 1) can pass to line 20 (FIG. 1), and vice versa. This short circuits the motor 14 and allows the vehicle to be towed with little resistance offered by the motor.

The shock valve 38, which is disposed in the system relief path and can operate as a bi-directional relief valve for the circuit 10 (FIG. 1). When the pressure differential between the first passage 118 and the second passage 120 is great enough to overcome the setting of the shock valve 38, fluid passes from the first counterbore 128 into the passage 126. Fluid in the passage 126, which is in communication with the second passage 120. Similarly, when the second passage 120 operates as a high pressure supply line and the pressure differential between the second passage 120 and the first passage 118 is great enough to overcome the shock valve 38, fluid from the second passage 120 can pass the counterbore 128 through the shock valve 38 and flow through the first angled passage 132 and into the first fluid line 118. Accordingly, pressure spikes in the hydraulic circuit 10 can be relieved by the shock valve 38.

In the depicted embodiment, four seals surround the valve body. The seals cooperate with an external surface of the valve body 62 and the internal surface of the bypass/flushing valve passage 124. The seals are spaced axially along the external surface of the valve body 62 and include a first seal 230 nearest the distal end 78, a second seal 232 moving toward the proximal end 74, a third seal 234, again moving toward the proximal end 74, and a fourth seal 236 adjacent the head 72. The seals 230, 232, 234 and 236 operate to block flow between adjacent ports between the external surface of the valve body 62 and the internal surface of the bypass/flushing valve passage 124.

In the depicted embodiment the first port 90 is an axial opening that is blocked from the second port 92, the third port 94, and the fourth port 96 through the bypass/flushing valve passage way 124 by the first seal 230. The first port 90 connects with the first passage 118 and operates as an inlet into the central bore 64 of the valve body 62 to allow fluid pressure to act against the shuttle valve 66.

The second bore 92 is disposed in a cutout 238 between the second seal 232 and the third seal 234. The second port 92 is blocked from the first port 90 and the third port 94 through the bypass/flushing valve passage 124 by the second seal 232. The second port 92 is blocked from the fourth port 96 through the bypass/flushing valve passage 124 by the third seal 234. The second port 92 connects directly with the second passage 120 and the bore 126.

The third port 94 is disposed in a cutout 242 disposed between the first seal 230 and the second seal 232. In the depicted embodiment, the third port 94 includes the first radial apertures 190 and the second radial apertures 192. The third port 94 connects with the tank line 46 (FIG. 1). The third port 94 is blocked from the first port 90 through the bypass/flushing valve passage 124 by the first seal 230. The third port 94 is blocked from the second port 92 and the fourth port 96 in the bypass/flushing valve passage 124 by the second seal 232.

The fourth port 96 is disposed in a cutout 244 disposed between the externally threaded section 82 and the third seal 234. The fourth port 96 is separated from the first port 90, the second port 92 and the third port 94 through the bypass/flushing valve passage 124 by the third seal 234. The fourth port 96 is blocked from ambient by the fourth seal 236. The fourth port 96 connects directly with the second angled bore 134.

A hydraulic circuit where the bypass valve and the flushing valve are disposed in the same housing or passage within a manifold has been described above in particularity. Modifications and alterations may occur to those who are skilled in the art after reading the preceding detailed description. The invention, however, is not limited to only the embodiments shown above. Instead, the invention is defined by the appended claims and the equivalents thereof.

The invention claimed is:

1. A bypass/flushing valve for a hydrostatic system comprising:
    a valve body including a central bore, a first port in communication with the central bore, a second port in communication with the central bore, a third port in communication with the central bore and a fourth port in communication with the central bore;
    a shuttle valve located in the central bore and blocking flow through the central bore between the first port and the second port, when pressure at the second port is higher than at the first port the shuttle valve moves to allow flow passage between the first port and the third port, when the pressure at the first port is higher than at the second port the shuttle valve moves to allow flow passage between the second port and the third port; and
    a valve spindle disposed within the central bore, the spindle being movable between a first position, which blocks flow between the second port and the fourth port, and a second position, which allows for flow between the second port and the fourth port.

2. The valve of claim 1, further comprising:
    a first spring in the central bore biasing the shuttle valve towards the second port; and
    a second spring in the central bore biasing the shuttle valve towards the first port.

3. The valve of claim 2, wherein the shuttle valve includes a first axial passage, a second axial passage, and a wall separating the first axial passage from the second axial passage to prevent axial flow through the shuttle valve from the first axial passage to the second axial passage, and vice versa.

4. The valve of claim 3, wherein the shuttle valve includes a first radial opening connected with the first axial passage and a second radial opening axially spaced from the first radial opening and connected with the second axial passage.

5. The valve of claim 4, wherein the third port includes a first radial aperture and a second radial aperture, the first radial aperture connecting with the first radial opening in the shuttle valve when a pressure difference between the first port and the second port is high enough to overcome a biasing force of the first spring, the second radial aperture connecting with the second radial opening in the shuttle valve when a pressure difference between the first port and the second port is high enough to overcome a biasing force of the second spring.

6. The valve of claim 1, wherein the shuttle valve is coaxial with the spindle.

7. A hydraulic assembly comprising:
    a pump housing;
    a first passage in the pump housing operable as a high pressure supply line or a low pressure return line;
    a second passage in the pump housing operable as a high pressure supply line or a low pressure return line;
    a tank line passage in the pump housing configured to connect with an associated reservoir;

a bypass/flushing valve passage in the pump housing and intersecting with the first passage and the second passage;

a system relief path in the pump housing and in communication with the first passage, the second passage and the bypass/flushing valve passage;

a flushing valve in the bypass/flushing valve passage, the flushing valve blocking flow between the first passage and the second passage through the bypass/flushing valve passage, when pressure in the second passage is higher than in the first passage the flushing valve allows flow passage between the first passage and the tank line passage, when the pressure in the first passage is higher than in the second passage the flushing valve allows flow passage between the second passage and the tank line passage; and a bypass valve in the bypass/flushing valve passage, the bypass valve operating in a first position, which blocks fluid flow between the first passage and the second passage through the system relief path, and a second position, which allows fluid flow between the first passage and the second passage through the system relief path.

8. The assembly of claim 7, wherein the bypass/flushing valve passage is formed having a linear central axis, and wherein the flushing valve includes a shuttle valve having a cylindrical configuration that is coaxial with the linear central axis.

9. The assembly of claim 8, wherein the bypass valve includes a spindle having a cylindrical configuration that is coaxial with the linear central axis.

10. The assembly of claim 9, further comprising a valve body received in the bypass/flushing valve passage, the valve body including a central bore coaxial with the linear central axis, the flushing valve and the bypass valve being received in the central bore.

11. The assembly of claim 7, further comprising a bi-directional relief valve in the system relief path that allows flow passage between the first passage and the second passage when a pressure differential between the first passage and the second passage is higher than a set pressure for the bi-directional relief valve.

12. A hydraulic assembly including:
a hydraulic pump housing including a first inlet/outlet passage, a second inlet/outlet passage, a tank line passage, a bypass/flushing valve passage connected with the first inlet/outlet passage, the second inlet/outlet passage and the tank line passage, and a system relief path connected to the bypass/flushing valve passage;

a valve body disposed in the bypass/flushing valve passage including a central bore, a first port in communication with the central bore and the first inlet/outlet passage, a second port in communication with the central bore and the second inlet/outlet passage, a third port in communication with the central bore and the tank line passage, and a fourth port in communication with the central bore and the system relief path;

a shuttle valve located in the central bore and blocking flow through the central bore between the first port and the second port, when pressure at the second port is higher than at the first port the shuttle valve moves to allow flow passage between the first port and the third port, when pressure at the first port is higher than at the second port the shuttle valve moves to allow flow passage between the second port and the third port; and a bypass valve spindle disposed within the central bore, the spindle being movable between a first position to block communication between the second port and the fourth port and a second position to allow for communication between the second port and the fourth port.

13. The assembly of claim 12, wherein the shuttle valve includes a first axial passage, a second axial passage, and a wall separating the first axial passage from the second axial passage to prevent axial flow through the shuttle valve from the first axial passage to the second axial passage, and vice versa.

14. The assembly of claim 13, wherein the shuttle valve includes a first radial opening connected with the first axial passage and a second radial opening connected with the second axial passage.

15. The assembly of claim 14, further comprising:
a first spring in the central bore biasing the shuttle valve towards the second port; and
a second spring in the central bore biasing the shuttle valve towards the first port.

16. The assembly of claim 15, wherein the third port includes a first radial aperture and a second radial aperture, the first radial aperture connecting with the first radial opening in the shuttle valve when a pressure difference between the first port and the second port is high enough to overcome a biasing force of the first spring, the second radial aperture connecting with the second opening in the shuttle valve when a pressure difference between the first port and the second port is high enough to overcome a biasing force of the second spring.

17. The assembly of claim 12, wherein the shuttle valve is cylindrical in configuration and coaxial with the central bore.

18. The assembly of claim 17, wherein the spindle has a cylindrical configuration and is coaxial with the shuttle valve.

19. The assembly of claim 12, further comprising a bi-directional relief valve in the system relief path that allows flow passage between the first port and the second port when a pressure differential between the first port and the second port is higher than a set pressure for the bi-directional relief valve.

* * * * *